(12) United States Patent
Kolste et al.

(10) Patent No.: US 11,814,902 B2
(45) Date of Patent: Nov. 14, 2023

(54) BEARING ASSEMBLIES, APPARATUSES, AND METHODS INCLUDING BEARING ELEMENTS

(71) Applicant: US Synthetic Corporation, Orem, UT (US)

(72) Inventors: Tyler Kolste, American Fork, UT (US); Daryl Wise, Provo, UT (US); S. Barrett Peterson, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 18/126,259

(22) Filed: Mar. 24, 2023

(65) Prior Publication Data

US 2023/0250694 A1 Aug. 10, 2023

Related U.S. Application Data

(63) Continuation of application No. 17/318,365, filed on May 12, 2021, now Pat. No. 11,619,099.

(51) Int. Cl.
*F16C 17/10* (2006.01)
*E21B 10/22* (2006.01)
*E21B 4/00* (2006.01)

(52) U.S. Cl.
CPC .............. *E21B 10/22* (2013.01); *E21B 4/003* (2013.01); *F16C 17/105* (2013.01); *F16C 2352/00* (2013.01)

(58) Field of Classification Search
CPC ........ F16C 17/10; F16C 17/105; F16C 17/26; F16C 33/043; F16C 2352/00; E21B 4/003
See application file for complete search history.

(56) References Cited

U.S. PATENT DOCUMENTS

| 3,478,523 A | 11/1969 | Reusser |
| 3,887,248 A | 6/1975 | Riegler |
| 4,029,368 A | 6/1977 | Tschirky |
| 4,080,014 A | 3/1978 | Riegler |
| 4,141,605 A | 2/1979 | Riordan |
| 4,190,301 A | 2/1980 | Lachonius |
| 4,410,054 A | 10/1983 | Nagel |
| 4,560,014 A | 12/1985 | Geczy |
| 4,662,348 A * | 5/1987 | Hall .................. B24B 1/00 384/907.1 |
| 4,720,199 A | 1/1988 | Geczy |
| 4,738,322 A | 4/1988 | Hall |
| 4,756,631 A | 7/1988 | Jones |
| 4,914,865 A | 4/1990 | Wiand |
| 5,267,398 A | 12/1993 | Hall |

(Continued)

FOREIGN PATENT DOCUMENTS

| EP | 3149348 A1 | 4/2017 |
| RU | 2044176 C1 | 9/1995 |

(Continued)

OTHER PUBLICATIONS

International Search Report and Written Opinion for PCTUS2022028198, dated Aug. 8, 2022, 10 pages.

*Primary Examiner* — Phillip A Johnson
(74) *Attorney, Agent, or Firm* — PCFB LLC

(57) ABSTRACT

Bearing assemblies, apparatuses, systems, and methods include bearing assemblies where one of the bearing assemblies may include bearing surfaces defining an at least partially conical surface.

20 Claims, 6 Drawing Sheets

(56) References Cited

U.S. PATENT DOCUMENTS

| | | |
|---|---|---|
| 7,552,782 B1 | 6/2009 | Sexton |
| 7,866,418 B2 | 1/2011 | Bertagnolli |
| 7,870,913 B1 | 1/2011 | Sexton |
| 7,901,137 B1 | 3/2011 | Peterson |
| 7,934,776 B2 | 5/2011 | de Andrade |
| 8,210,747 B2 | 7/2012 | Cooley |
| 8,312,631 B2 | 11/2012 | Sexton |
| 8,613,554 B2 | 12/2013 | Tessier |
| 8,708,564 B2 | 4/2014 | Cooley |
| 8,814,434 B1 | 8/2014 | Sexton |
| 9,115,752 B2 * | 8/2015 | Wenzel ............... F16C 17/10 |
| 9,562,562 B2 | 2/2017 | Peterson |
| 2007/0046119 A1 | 3/2007 | Cooley |
| 2009/0008892 A1 | 1/2009 | Gaumer |
| 2010/0226759 A1 | 9/2010 | Cooley |
| 2010/0237621 A1 | 9/2010 | Tessier |
| 2010/0288558 A1 | 11/2010 | Sexton |
| 2011/0024198 A1 | 2/2011 | Dick |
| 2011/0192648 A1 | 8/2011 | Baudoin |
| 2012/0039551 A1 | 2/2012 | Cooley |
| 2012/0057814 A1 | 3/2012 | Dadson |
| 2012/0281938 A1 | 11/2012 | Peterson |
| 2012/0321232 A1 | 12/2012 | Cooley |
| 2013/0004106 A1 | 1/2013 | Wenzel |
| 2013/0170778 A1 | 7/2013 | Higginbotham |
| 2013/0299243 A1 * | 11/2013 | von Gynz-Rekowski ............... E21B 4/003 175/57 |
| 2015/0345548 A1 * | 12/2015 | Peterson ............ F16C 17/02 384/282 |
| 2016/0312535 A1 * | 10/2016 | Ritchie ............... F16C 33/26 |
| 2017/0146060 A1 * | 5/2017 | Cooley ............... F16C 33/26 |

FOREIGN PATENT DOCUMENTS

| | | |
|---|---|---|
| RU | 107299 U1 | 8/2011 |
| WO | 2020028189 A1 | 2/2020 |

* cited by examiner

BEARING ASSEMBLIES, APPARATUSES, AND METHODS INCLUDING BEARING ELEMENTS

CROSS REFERENCE TO RELATED APPLICATIONS

This application is a continuation of U.S. Provisional patent application Ser. No. 17/318,365, filed May 12, 2021, for "BEARING ASSEMBLIES, APPARATUSES, AND METHODS INCLUDING BEARING ELEMENTS," the disclosure of which is incorporated herein in its entirety by reference.

TECHNICAL FIELD

This application relates to bearings assemblies including bearing elements and related assemblies, apparatuses, and methods.

BACKGROUND

Thrust and bearing apparatuses are commonly used in a variety of mechanical applications. For example, subterranean drilling systems, turbomachinery, hydroelectric plants, windmills, cranes, turbine generators, pumps, and power plant machinery may utilize bearing assemblies.

A subterranean drilling system may include one or more thrust-bearing and/or bearing apparatuses that are operably coupled to the downhole drilling motor for carrying loads generated during drilling operations. Bearing apparatuses utilized in such drilling systems may each include a stator that does not rotate and a rotor that is surrounded by the stator and that is attached to the output shaft to rotate with the output shaft. The stator and rotor may each include a plurality of superhard bearing elements or inserts.

Wear-resistant, superhard materials may be utilized for bearing elements utilized in bearing assemblies. A polycrystalline diamond compact (PDC) bearing assembly may include steel rotor and stator bearing rings that are each configured to accept a number of superhard bearing elements. Each superhard bearing element may include a polycrystalline diamond (PCD) layer formed on a substrate, such as a cemented tungsten carbide substrate. One or more superhard bearing elements may be attached to a bearing rotor or stator by press-fitting, brazing, or through other suitable methods of attachment. Typically, bearing elements attached to a bearing rotor have superhard bearing surfaces configured and oriented radially outward to bear against opposing superhard bearing surfaces of bearing elements attached to a bearing stator that radially surrounds the bearing rotor.

During drilling operations, an output shaft that transfers rotational torque from a drilling motor to a drill bit may be deflected at various angles relative to the rotational axis of a bearing apparatus. Over time, such repeated deflection of the output shaft may cause a bearing rotor attached to the output shaft to become axially misaligned with respect to a bearing stator surrounding the bearing rotor. Axial misalignment of the bearing rotor from the bearing stator may result in a decrease in bearing performance or bearing failure.

SUMMARY

Embodiments of the instant disclosure may be directed to bearing assemblies systems, and bearing apparatuses. According to some embodiments, a bearing apparatus may comprise an inner bearing assembly and an outer bearing assembly. The inner bearing assembly may comprise an inner support ring positioned about an inner bearing axis and one or more inner bearing elements coupled to the inner support ring. The one or more inner bearing elements may each have an outward-facing bearing surface exhibiting a partially spherical convex shape. The outer bearing assembly may comprise an outer support ring positioned about an outer bearing axis and outer bearing elements coupled to the outer support ring. The outer bearing elements may each have an inward-facing bearing surface exhibiting a partially cylindrical concave shape, where the cylindrical concave shape of each of the outer bearing elements collectively define an at least partially conical inner surface substantially centered about the inner bearing axis. The at least partially conical inner surface of the outer bearing elements may be configured to engage with the outward-facing bearing surface of each of the one or more inner bearing elements.

According to some embodiments, a bearing apparatus may comprise a first bearing assembly and a second bearing assembly. The first bearing assembly may comprise a first support ring positioned circumferentially around a first bearing axis and one or more first bearing elements coupled to the first support ring. The one or more first bearing elements may each have an outward-facing bearing surface. The second bearing assembly may comprise a second support ring positioned circumferentially around a second bearing axis and second bearing elements coupled to the second support ring. The second bearing elements may each have an inward-facing bearing surface collectively defining an at least partially conical surface substantially centered about the second bearing axis. The at least partially conical surface of the second bearing elements may be configured to engage with the outward-facing bearing surface of each of the one or more first bearing elements.

According to some embodiments a method of forming a bearing assembly may comprise forming an inner bearing assembly comprising coupling one or more inner bearing elements to an inner support ring; and orienting the one or more inner bearing elements to each define an outward-facing bearing surface. The method may further include forming an outer bearing assembly comprising coupling outer bearing elements to an outer support ring; orienting the outer bearing elements to define an inward-facing bearing surface; collectively defining an at least partially conical inner surface with the outer bearing elements; and positioning the inner bearing assembly at least partially within the outer bearing assembly such that the at least partially conical inner surface of the outer bearing elements engage with the outward-facing bearing surface of each of the one or more inner bearing elements.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION

The instant disclosure is directed to exemplary bearing assemblies and bearing apparatuses including superhard bearing elements. These bearing apparatuses may include radial bearings, thrust bearings, and other bearing apparatuses without limitation. Such bearing apparatuses may be used in a variety of applications, including subterranean drilling systems, directional drilling systems, turbine generators, windmills, cranes, machinery, pumps, and any other suitable applications, without limitation.

The terms "superabrasive" and "superhard," as used herein, may refer to any material having a hardness that is at least equal to a hardness of tungsten carbide. For example, a superhard article may represent an article of manufacture, at least a portion of which may exhibit a hardness that is equal to or greater than the hardness of tungsten carbide.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical," "lateral," and "radial" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

Figure 1:
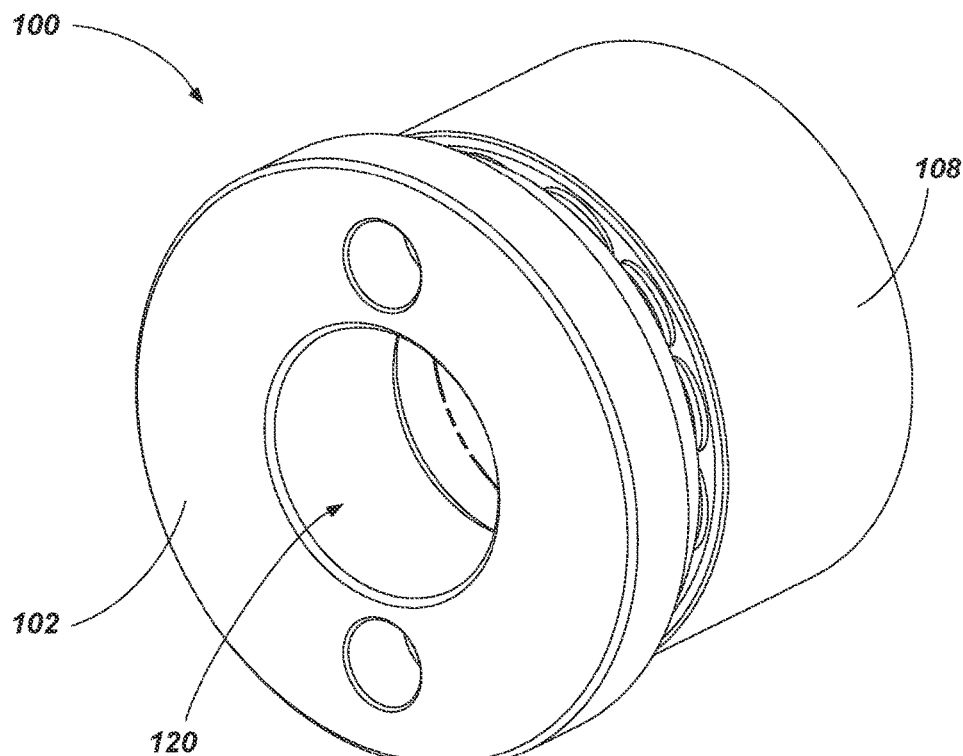
FIG. 1 is a perspective view of a bearing apparatus according to an embodiment of the disclosure.
Figure 2:
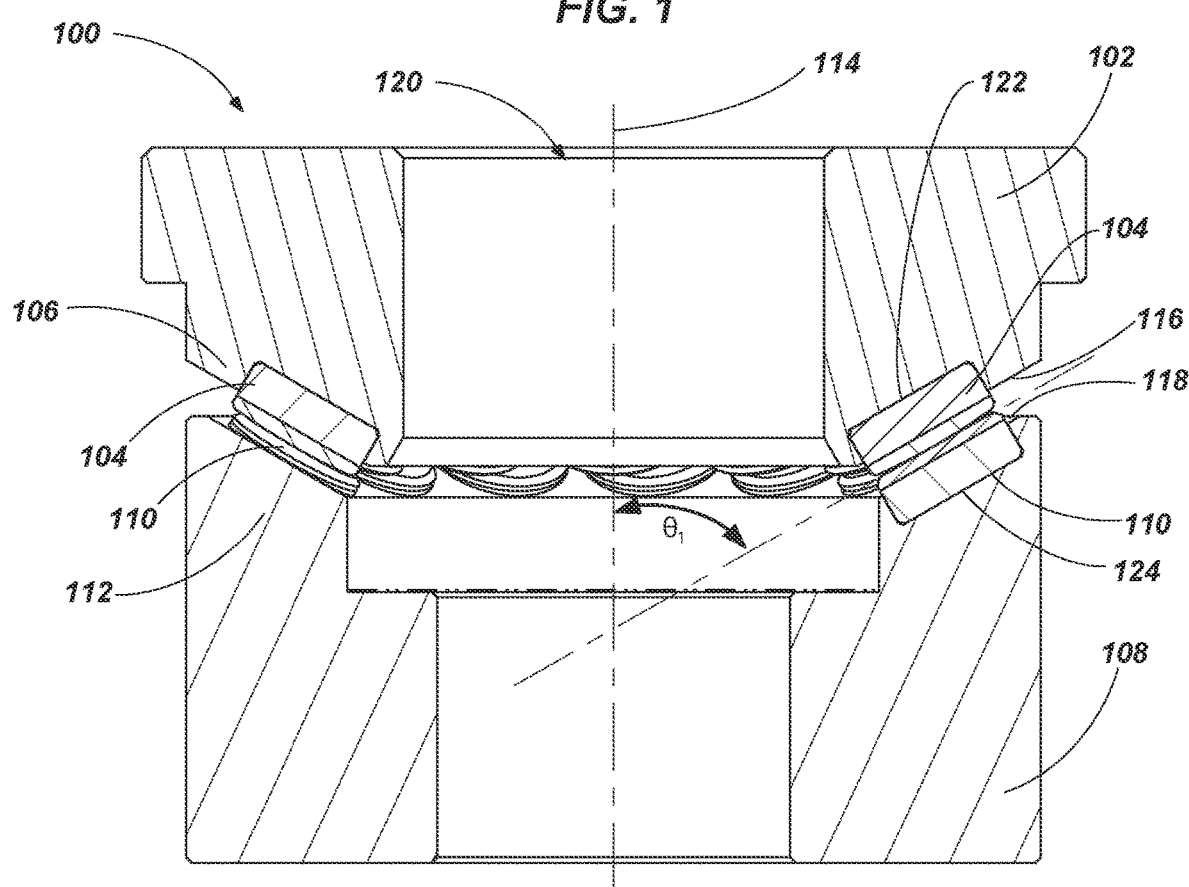
FIG. 2 is a cross-sectional view of the bearing apparatus shown in FIG. 1.

FIG. 1 is a perspective view of a bearing apparatus 100 (e.g., in a primarily thrust bearing configuration) according to at least one embodiment and FIG. 2 is a cross-sectional view of the bearing apparatus 100. As illustrated in FIGS. 1 and 2, the bearing apparatus 100 may be configured as a thrust bearing to primarily support axial loads. For example, the bearing apparatus 100 may be configured to support a load where a majority of the load is applied in an axial direction and where a lesser amount of load is applied in a lateral or radial direction. In additional embodiments, and as discussed below, the bearing apparatus 100 may be configured as radial bearing configured to primarily support radial loads. For example, the bearing apparatus 100 may be configured to support a load where a majority of the load is applied in a lateral or radial direction and where a lesser amount of load is applied in an axial direction.

Figure 3:
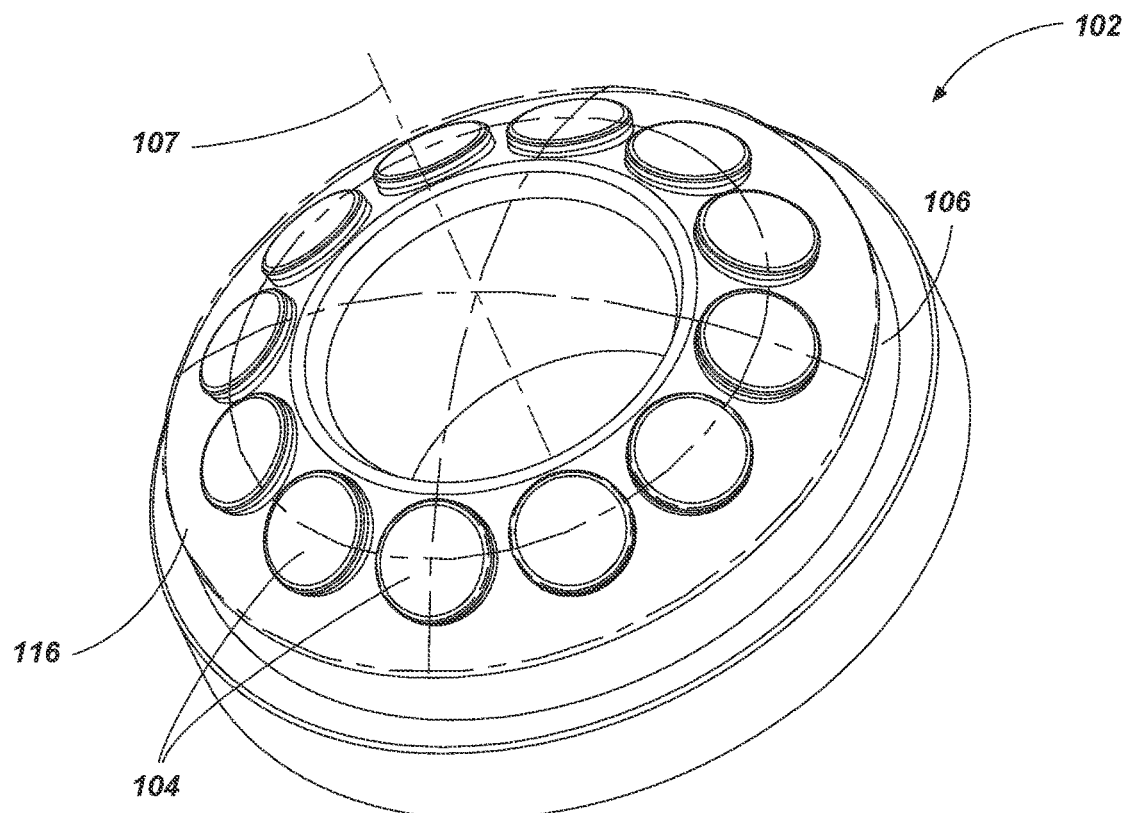
FIG. 3 is a perspective view of a bearing assembly according to an embodiment of the disclosure.

As depicted in FIG. 3, bearing apparatus 100 may comprise a first bearing assembly 102 (e.g., an inner race or assembly) having bearing elements 104 (e.g., superhard bearing elements) coupled to a first support structure 106 and arranged about a central point or inner bearing axis 107. The bearing elements 104 may be positioned in the first support structure 106 at a substantially similar or the same oblique angle relative to the inner bearing axis 107.

Figure 5:
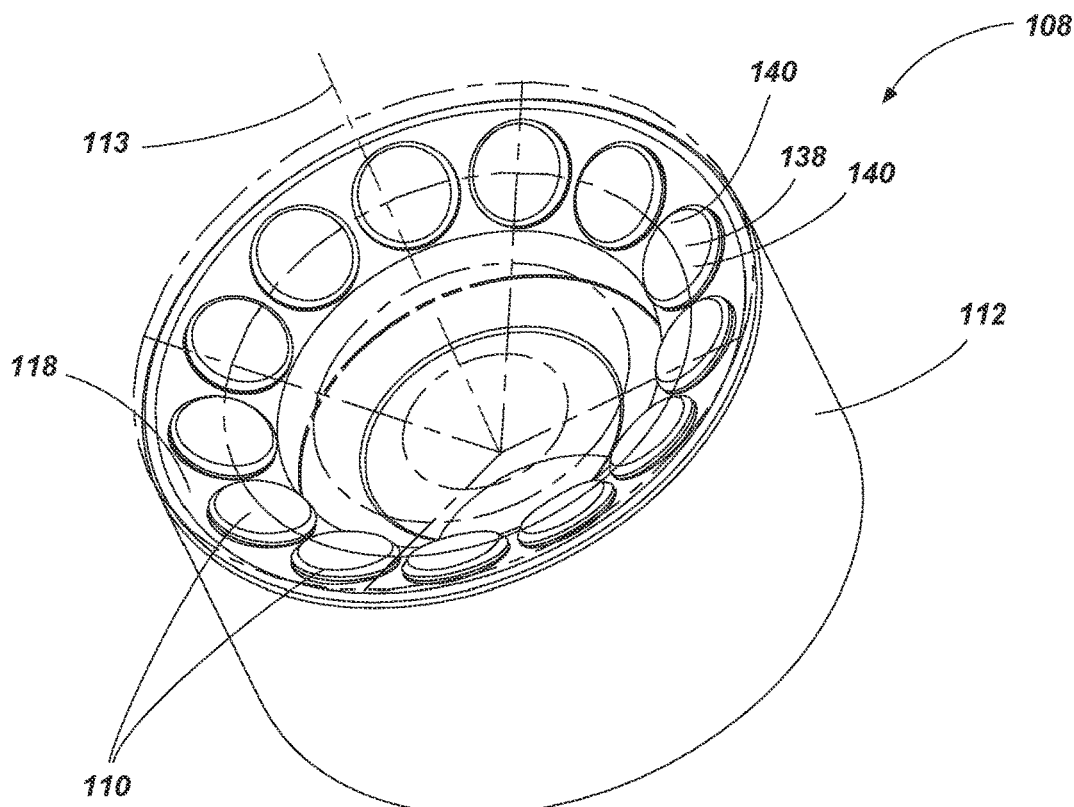
FIG. 5 is a perspective view of a bearing assembly according to an embodiment of the disclosure.

As shown in FIG. 5, bearing apparatus 100 may additionally comprise a second bearing assembly 108 (e.g., an outer race or assembly) having bearing elements 110 (e.g., superhard bearing elements) coupled to a second support structure 112 and arranged about a central point or outer bearing axis 113. As depicted, a portion of the first support structure 106 of the first bearing assembly 102 may be received in the second support structure 112 of the second bearing assembly 108. The bearing elements 110 may be positioned in the second support structure 112 at a substantially similar or the same oblique angle relative to the outer bearing axis 113.

In some embodiments, either of first bearing assembly 102 and second bearing assembly 108 may be configured as a rotor or a stator. For example, if second bearing assembly 108 is configured to remain stationary, second bearing assembly 108 may be referred to as the stator and the first bearing assembly 102 may be referred to as the rotor that moves (e.g., rotates, pivots, oscillates, swivels, etc.) relative to second bearing assembly 108. Additionally, the first bearing assembly 102 may be a stator configured to remain stationary and second bearing assembly 108 may be a rotor configured to move (e.g., rotates, pivots, oscillates, swivels, etc.) relative to first bearing assembly 102. In some embodiments, both the first bearing assembly 102 and the second bearing assembly 108 may move (e.g., rotates, pivots, oscillates, swivels, etc.) relative to each other.

First bearing assembly 102 and second bearing assembly 108 may each be arranged circumferentially around a central bearing axis (e.g., longitudinal axis 114). The longitudinal axis 114 may comprise a rotational axis about which first bearing assembly 102 or second bearing assembly 108 rotates. However, a rotational axis of first bearing assembly 102 and/or second bearing assembly 108 may not be aligned with longitudinal axis 114 at all times during operation. For example, during a drilling operation, second bearing assembly 108 may be circumferentially centered about longitudinal axis 114 while the first bearing assembly 102 is circumferentially centered about and/or rotates about a rotational axis that is oriented at an angle with respect to the longitudinal axis 114.

While the assemblies 102, 108 are discussed as rotating (e.g., one relative to the other and/or both together), some embodiments may involve additional and/or differing types of movement. For example, the first bearing assembly 102 and the second bearing assembly 108 may define a revolute and/or spheroid joint (e.g., a hip joint and/or a ball joint) that enables the first bearing assembly 102 and the second bearing assembly 108 to rotate about differing axes (e.g., radial axes), pivot, oscillate, and/or swivel relative to each other. In some embodiments, a shaft coupled to the first bearing assembly 102 may pivot as the first bearing assembly 102 moves with the second bearing assembly 108 while partially rotating or substantially not rotating relative to the second bearing assembly 108 or vice versa. By way of further example, the first bearing assembly 102 may move (e.g., slide) about a radial axis within a bowl defined by the second bearing assembly 108 (e.g., as the first bearing assembly 102 partially moves into and back out of the bowl).

First support structure 106 may comprise an outer surface 116 facing radially outward that opposes an inner surface 118 of the second support structure 112 that faces radially inward with respect to the longitudinal axis 114.

Bearing apparatus 100 may include a central aperture 120 defined the first support structure 106 and/or the second support structure 112 that may receive a shaft (e.g., a rotational motor shaft). As depicted, aperture 120 may be generally centered about longitudinal axis 114.

First support structure 106 may be configured to receive multiple bearing elements 104 that may each be attached within a corresponding recess 122 defined in first support structure 106. Second support structure 112 may be configured to receive multiple bearing elements 110 that may each be attached within a corresponding recess 124 defined in second support structure 112. Each bearing element 104 may extend beyond outer surface 116 of first support structure 106 by a selected distance and/or profile. Each bearing element 110 may extend beyond inner surface 118 of second support structure 112 by a selected distance and/or profile. Each of bearing elements 104 and bearing elements 110 may be fixedly secured within a corresponding recess 122, 124, respectively, through brazing, press-fitting, threaded attachment, pin attachment, bonding, frictional engagement, and/or by any other suitable attachment mechanism, without limitation.

Any suitable number of bearing elements 104 and bearing elements 110 may be secured, respectively, to first support structure 106 and second support structure 112. For example, each bearing element 104 may be secured within the corresponding recess 122 defined in first support structure 106. Additionally, each bearing element 110 may be secured within the corresponding recess 124 defined in second support structure 112. First bearing assembly 102 may comprise the same number or a different number of bearing elements 104 in comparison with the number of bearing elements 110 included in second bearing assembly 108. Additionally, bearing elements 104 may have substantially the same size/dimension (e.g., diameters) as bearing elements 110 or different size/dimension than bearing elements 110.

First support structure 106 and second support structure 112 may each be made from a variety of different materials. For example, first support structure 106 and/or second support structure 112 may comprise a metallic material (e.g., carbon steel, titanium or titanium alloys, tungsten or tungsten alloys, aluminum or aluminum alloys, or stainless steel, etc.), a carbide material (e.g., tungsten carbide, silicon carbide, etc.), or any other suitable material. In some embodiments, first support structure 106 and/or second support structure 112 may be made of a material with relatively high thermal conductivity (e.g., a thermal conductivity equal to or exceeding tungsten carbide or cobalt-cemented tungsten carbide). Bearing elements 104, 110 may each abut or contact a respective support structure 106, 112 over a selected (e.g., a substantial) surface area of the bearing element 104, 110 in order to promote heat transfer from the bearing element 104, 110 to support structure 106, 112.

In some embodiments, first support structure 106 and/or second support structure 112 may include an erosion-resistant and/or abrasion-resistant coating applied thereto. For example, an erosion-resistant and abrasion resistant coating may include a coating including, for example, a urethane rubber or other suitable coating, without limitation. In other embodiments, a hardfacing coating (e.g., tungsten carbide hardfacing) may be applied to first support structure 106 and/or second support structure 112 by any suitable method, including, without limitation, flame spraying, welding HVOF (high velocity oxy-fuel coating spraying), and/or laser cladding.

In some embodiments, bearing elements 104 may be positioned and oriented on first support structure 106 and bearing elements 110 may be positioned and oriented on second support structure 112 such that bearing surfaces of one or more of bearing elements 104 contact opposing bearing surfaces of one or more of bearing elements 110, respectively. When first bearing assembly 102 and second bearing assembly 108 are assembled together (e.g., in a ball-and-socket-type configuration), bearing surfaces of bearing elements 104 and the opposing bearing surfaces of bearing elements 110 may bear against each other and move relative to each other as first bearing assembly 102 rotates relative to second bearing assembly 108. As will be described in greater detail below, bearing elements 104 and bearing elements 110 may comprise various surface shapes and configurations for achieving desired contact and freedom of movement between opposing bearing surfaces.

As depicted, an interface between the bearing elements 104 and bearing elements 110 may define a selected angle $\theta 1$ with respect to the longitudinal axis 114. For example, operating primarily as a thrust bearing, the angle $\theta 1$ of the interface between the bearing elements 104, 110 may be 45 degrees or more (e.g., 45 to 90 degrees, 60 degrees, 50 to 70 degrees, etc.) relative to the longitudinal axis 114.

FIG. 3 is a perspective view of a bearing assembly including bearing elements on a support structure (e.g., first bearing assembly 102). As illustrated in FIG. 3, bearing elements 104 may be mounted within the first support structure 106. Bearing elements 104 may each extend radially outward from the first support structure 106 such that at least a portion of the bearing element 104 extends past an outer surface 116 of first support structure 106. A portion of bearing element 104 extending from first support structure 106 may comprise a bearing surface 126 (e.g., a superhard bearing surface).

Bearing surface 126 may comprise any suitable shape, without limitation (e.g., a planar shape, a rounded or curved shape (e.g., a partially ovoid, partially ellipsoid, partially spheroid, or otherwise elliptical shape), a convex shape, a concave shape, a conical shape, a cylindrical shape, combinations thereof, etc.). For example, bearing surface 126 may comprise an at least partially rounded or ellipsoidal convex surface (e.g., where the surface is rounded or curved in at least two traverse axes of direction). In some embodiments, bearing surface 126 may comprise a partially ellipsoidal, a partially cylindrical surface (e.g., a convex cylindrical surface), and/or partially spherical shape.

As depicted by the dashed lines in FIG. 3, the bearing surfaces 126 and/or the angular orientation of the first support structure 106 that positions the bearing elements 104 may collectively define a convex, partially spherical shape. Where the individual bearing surfaces 126 each exhibit partial spherical convex surface, at least a portion of each of the individual bearing surfaces 126 may define (e.g., fall within) the overall or collective convex, partially spherical shape of the first bearing assembly 102 (e.g., defined by the plurality of the spherical bearing surfaces 126, a majority of the bearing surfaces 126, and/or a substantial entirety of the bearing surfaces 126, without limitation).

Figure 4:
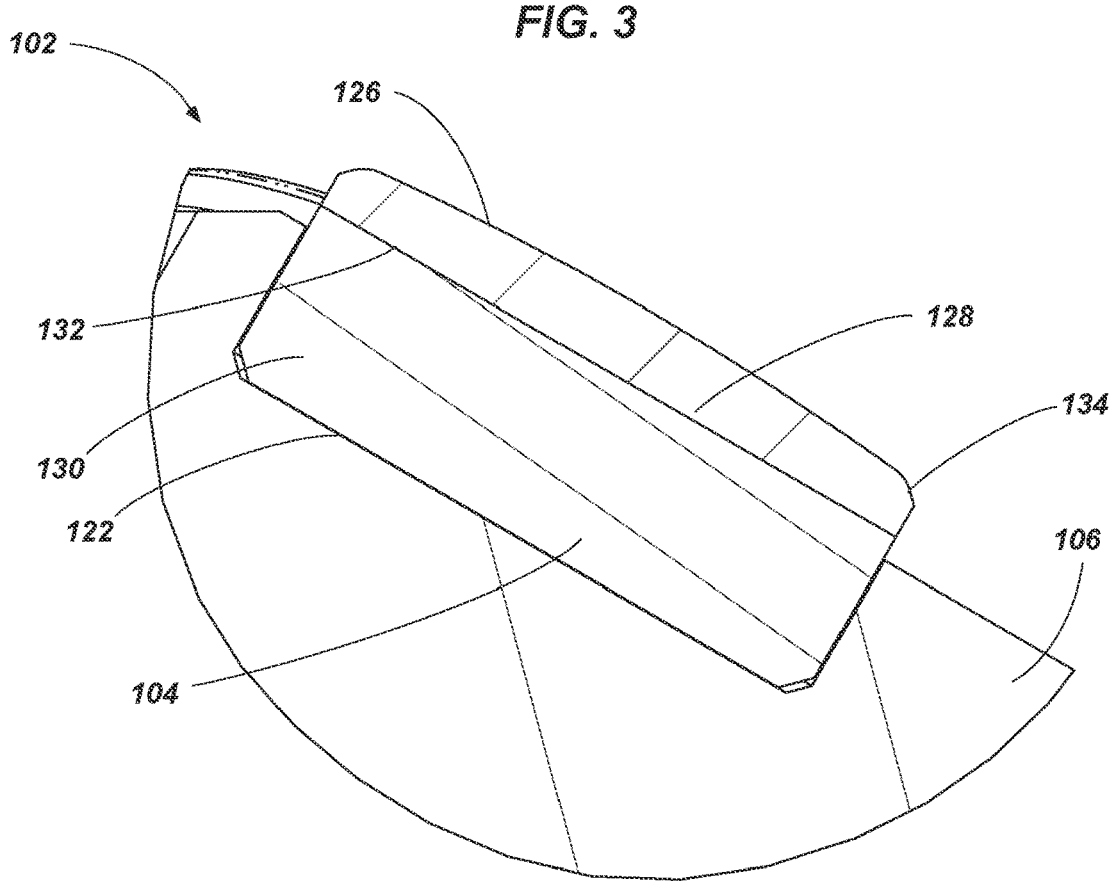
FIG. 4 is a cross-sectional view of a portion of the bearing apparatus shown in FIG. 3.

FIG. 4 is a cross-sectional view of a portion of the bearing assembly 102 shown in FIG. 3. As shown in FIG. 4, bearing element 104 may comprise a superhard table 128 affixed to or formed upon a substrate 130. Superhard table 128 may be affixed to substrate 130 at interface 132.

Bearing element 104 may also include a chamfer 134 between a side surface and bearing surface 126. Chamfer 134 may comprise an angular, sloped, and/or rounded edge formed at the intersection of superhard side surface and bearing surface 126. Any suitable surface shape may be formed at the intersection of superhard side surface and bearing surface 126, such as those disclosed in U.S. Pat. No. 8,708,564, the disclosure of which is incorporated herein in its entirety by this reference. Any other suitable surface shape may also be formed between superhard side surface and bearing surface 126, including, without limitation, an arcuate surface (e.g., a radius, an ovoid shape, or any other rounded shape), a sharp edge, multiple chamfers/radii, a honed edge, and/or combinations of the foregoing.

Bearing element 104 may comprise any suitable size, shape, and/or geometry, without limitation. As depicted, bearing surface 126 may comprise a convex, partial-ellipsoidal or substantially partial-ellipsoidal surface shape. A cross-sectional view of bearing element 104 taken along a plane parallel to the central element axis may have a convex, partial-circular or substantially partial-circular profile for bearing surface 126 as shown in FIG. 4. In some embodiments, bearing surface 126 may comprise a partial-spherical shape or a substantially partial-spherical surface shape. In such embodiments, each cross-sectional view of bearing element 104 taken along a plane intersecting a central element axis of the bearing element 104 may have substantially the same or similar profile.

In some embodiments, the individual bearing surfaces 126 of the bearing elements 104 may each exhibit a convex shape that, taken together, collectively define a substantially partial-spherical or frusto-spherical shape.

Substrate 130 may comprise any suitable material on which superhard table 128 may be formed. In at least one embodiment, substrate 130 may comprise a cemented carbide material, such as a cobalt-cemented tungsten carbide material and/or any other suitable material. In some embodiments, substrate 130 may include a suitable metal-solvent catalyst material, such as, for example, cobalt, nickel, iron, and/or alloys thereof. Substrate 130 may also include any suitable material including, without limitation, cemented carbides such as titanium carbide, tungsten carbide, niobium carbide, tantalum carbide, vanadium carbide, chromium carbide, and/or combinations of any of the preceding carbides cemented with iron, nickel, cobalt, and/or alloys thereof. Superhard table 128 may be formed of any suitable superabrasive and/or superhard material or combination of materials, including, for example PCD. Any of the superhard tables disclosed herein may also comprise polycrystalline diamond materials, such as those disclosed in U.S. Pat. No. 7,866,418, the disclosure of which is incorporated herein in its entirety, by this reference. According to additional embodiments, superhard table 128 may comprise cubic boron nitride, silicon carbide, polycrystalline diamond, and/or mixtures or composites including one or more of the foregoing materials, without limitation.

Superhard table 128 of bearing element 104 may be formed using any suitable technique. According to some embodiments, superhard table 128 may comprise a PCD table fabricated by subjecting a plurality of diamond particles to a high pressure, high temperature (HPHT) sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., sp3-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution or mixture.

Following sintering, various materials, such as a metal-solvent catalyst, remaining in interstitial regions within the as-sintered PCD body may reduce the thermal stability of superhard table 128 at elevated temperatures. In some examples, differences in thermal expansion coefficients between diamond grains in the as-sintered PCD body and a metal-solvent catalyst in interstitial regions between the diamond grains may weaken portions of superhard table 128 that are exposed to elevated temperatures, such as temperatures developed during bearing operation. The weakened portions of superhard table 128 may become excessively worn and/or damaged during bearing operation.

Removing the metal-solvent catalyst and/or other materials from the as-sintered PCD body may improve the heat resistance and/or thermal stability of superhard table 128, particularly in situations where the PCD material may be exposed to elevated temperatures. A metal-solvent catalyst and/or other materials may be removed (e.g., at least partially removed) from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of superhard table 128. Removing a metal-solvent catalyst from the as-sintered PCD body may reduce damage to the PCD material of superhard table 128 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, chemical and/or gaseous leaching may be used to remove a metal-solvent catalyst from the as-sintered PCD body up to a desired depth from a surface thereof. The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form superhard table 128 comprising a PCD table. For example, the as-sintered PCD body may be immersed in or exposed to the acid for about 2 to about 7 days (e.g., about 3, 5, or 7 days) or for a few weeks (e.g., about 4 weeks) depending on the process employed.

Even after leaching, a residual, detectable amount of the metal-solvent catalyst may be present in the at least partially leached superhard table 128. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superhard table 128 in an unleached state. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, at least a portion of superhard table 128 may comprise a volume of PCD material that is substantially free of a metal-solvent catalyst.

The plurality of diamond particles used to form superhard table 128 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes) without limitation.

FIG. 5 is a perspective view of a bearing assembly including a plurality of bearing elements attached to a support structure (e.g., second bearing assembly 108). As illustrated in FIG. 5, bearing elements 110 may be mounted within the second support structure 112. Bearing elements 110 may each extend radially inward from the second support structure 112 such that at least a portion of the bearing element 110 extends past an inner surface 118 of the second support structure 112. A portion of bearing element 110 extending from second support structure 112 may comprise a bearing surface 136.

The bearing surface 136 of one or more of the bearing elements 110 (e.g., each bearing element 110) may comprise an at least partially concave rounded shape that is at least partially complementary to the shape of the bearing surface 126 of the bearing elements 104 of the first bearing assembly 102. For example, the bearing surfaces 136 of the bearing elements 110 may comprise a concave partial conical surface (e.g., a portion of a conical concave surface, a frusto-conical surface). As discussed in greater detail below, the bearing surface 136 may exhibit a ramped or tapered shape (when viewed in a cross-sectional view) with a central lower portion that extends along a substantial portion of the diameter of the bearing surface 136 and is bordered by two higher portions positioned at or near two outer radial sections of the bearing elements 110.

In some embodiments, when compared to bearing surface 126, bearing surface 136 may not comprise a partial spherical surface shape. Rather, the bearing surface 136 may exhibit a curvature (e.g., a major or maximal curvature that is greater than zero) substantially along only one reference axis (as opposed to a spherical surface that exhibits a similar curvature along more than one reference axis). In such an embodiment, another reference axis along the bearing surface 136 that is transverse (e.g., perpendicular) to the one reference axis with the curvature may exhibit minimal curvature (e.g., approaching or equal to zero curvature).

As depicted by the dashed lines in FIG. 5, the bearing surfaces 136 and/or the angular orientation of the second support structure 112 that positions the bearing elements 110 may collectively define a concave, at least partially conical shape (e.g., tapering smoothly with respect to a pointed apex or vertex). For example, the individual bearing surfaces 136 of the bearing elements 110 may each exhibit a concave partial conical shape where a majority (e.g., a substantial entirety) of the bearing surfaces 136 of the bearing elements 110 collectively, when taken together, define (e.g., lie within or upon) a frustoconical shape. As depicted, a portion (e.g., a majority, a substantial entirety) of each of the individual bearing surfaces 136 may be configured to accommodate the overall convex shape of the overall first bearing assembly 102 (e.g., when first bearing assembly 102 is assembled with second bearing assembly 108). The overall convex conical shape of the support structure 106 of first bearing assembly 102 may exhibit a gradually decreasing radius with an end portion including a pointed or rounded radially innermost wall that is discontinuous with the remainder of the conical shape (e.g., extending horizontally/radially inward). In some embodiments, the overall convex conical shape of the support structure 106 may be substantially conical in that it approximates a portion of a cone to define an overall partially conical bearing surface on which the second bearing assembly 108 may travel. Similarly, the bearing surfaces 136 may each be substantially cylindrical such that, when fixed at an oblique angle relative to the outer bearing axis 113, each of the bearing surfaces 136 approximate a portion of cone or conical shape.

Figure 6:
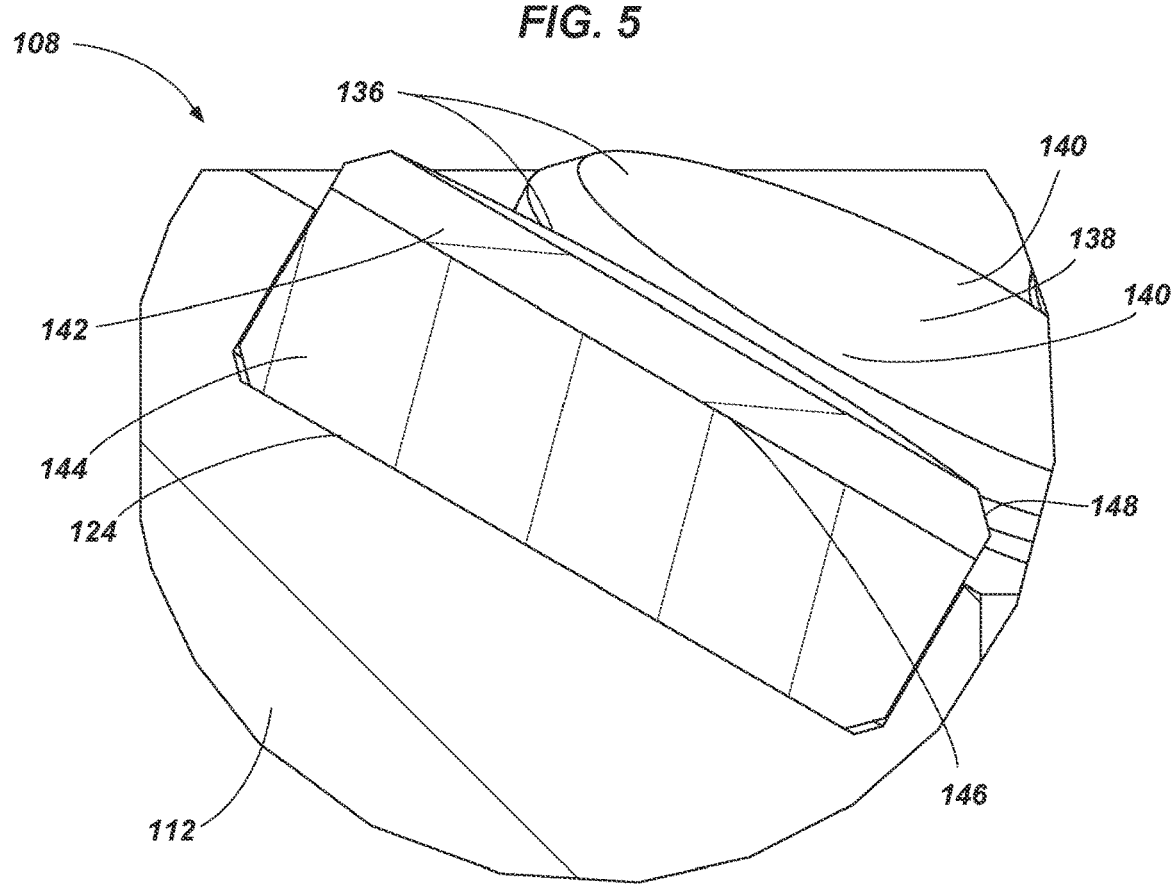
FIG. 6 is a cross-sectional view of a portion of the bearing apparatus shown in FIG. 5.

FIG. 6 is a cross-sectional view of a portion of the bearing apparatus (e.g., the second bearing assembly 108) shown in FIG. 5. As depicted in FIG. 6, the bearing elements 110 may each include may exhibit a ramped or tapered shape with a central lower portion 138 that extends along a diameter of the bearing surface 136 (e.g., from a first lateral side to a second opposing lateral side). The central lower portion 138 (e.g., central curved portion) is bordered on opposing lateral sides by two opposing higher portions 140 (e.g., two ramp potions) positioned at two outer lateral sections of the bearing elements 110. For example, the four outer quadrants of the bearing surface 136 include two opposing radially outward sections of the central lower portion 138 that are interspersed between the opposing higher portions 140 about the circumference of the bearing surface 136.

As further shown in FIG. 6, the cross section is taken in a first direction along a line that is tangential to the elliptical shape of the second bearing assembly 108. Along this tangential cross section, the bearing surface 136 may exhibit a curvature (e.g., a major or maximal curvature that is greater than zero). Where the overall shape of the bearing surface 136 substantially exhibits a concave partially conical shape, the tangential cross section shown in FIG. 6 taken at any point along the diameter of the bearing element 110 that is tangent to the curvature of the overall second bearing assembly 108 may exhibit substantially the same curvature (e.g., a depicted in the figure, into or out of the drawing paper).

Figure 7:
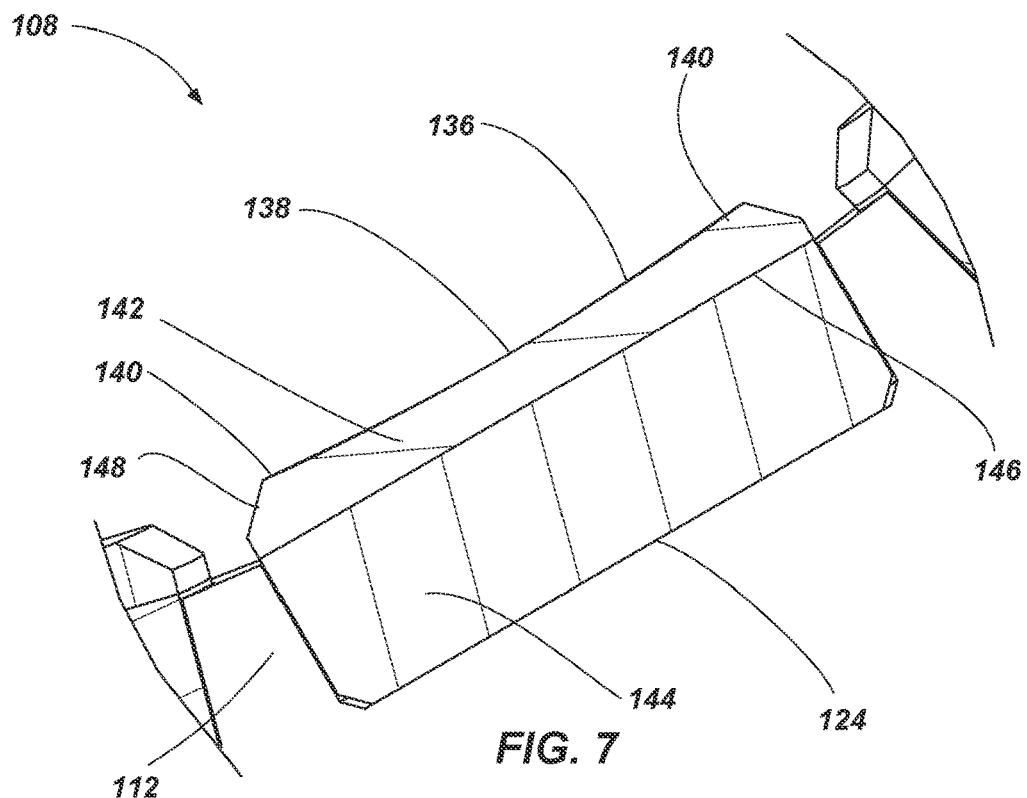
FIG. 7 is another cross-sectional view of a portion of the bearing apparatus shown in FIG. 5.

FIG. 7 is another cross-sectional view of a portion of the second bearing assembly 108 shown in FIG. 5 that is taken substantially perpendicular (e.g., approximately 90 degrees) to the view in FIG. 6. As shown in FIG. 7, the cross section is taken in a second direction along a radial axis of the second bearing assembly 108 (e.g., a line normal to the curved (e.g., ellipsoid, conical, etc.) shape of the second bearing assembly 108). As depicted, the bearing surface 136 may comprise a substantially planar line exhibiting minimal (e.g., no) curvature (e.g., a curvature approaching or equal to zero). Where the overall shape of the bearing surface 136 substantially exhibits a concave conical shape, the normal or radial cross section shown in FIG. 7 taken at any point along the diameter of the bearing element 110 that is normal to the curvature of the overall second bearing assembly 108 may exhibit substantially the same geometrical characteristics (e.g., a depicted in the figure, into or out of the drawing paper).

Similar to bearing element 104 discussed above, bearing element 110 may comprise a superhard table 142 affixed to or formed upon a substrate 144 at an interface 146 with a chamfer 148. The components of bearing element 110 (e.g., the superhard table 142 and the substrate 144) may be formed from similar and/or identical materials in similar and/or identical configurations to those discussed above with respect to bearing element 104.

In some embodiments, the bearing surfaces 126, 136 may be machined (e.g., by a grinding process, laser ablation, and/or electro-discharge machining) after or prior to being assembled with each respective support structure 106, 112 so that bearing surfaces 126, 136 exhibits a center of curvature that is substantially coincident with each other and with an intended path of rotation. However, as the substantially conical concave bearing surfaces 136 may be relatively less complex to form (e.g., as compared to the convex spherical shape of the bearing surfaces 126), such a configuration may require relatively less processing to machine (e.g., grind) into the bearing elements 110.

Figure 8:
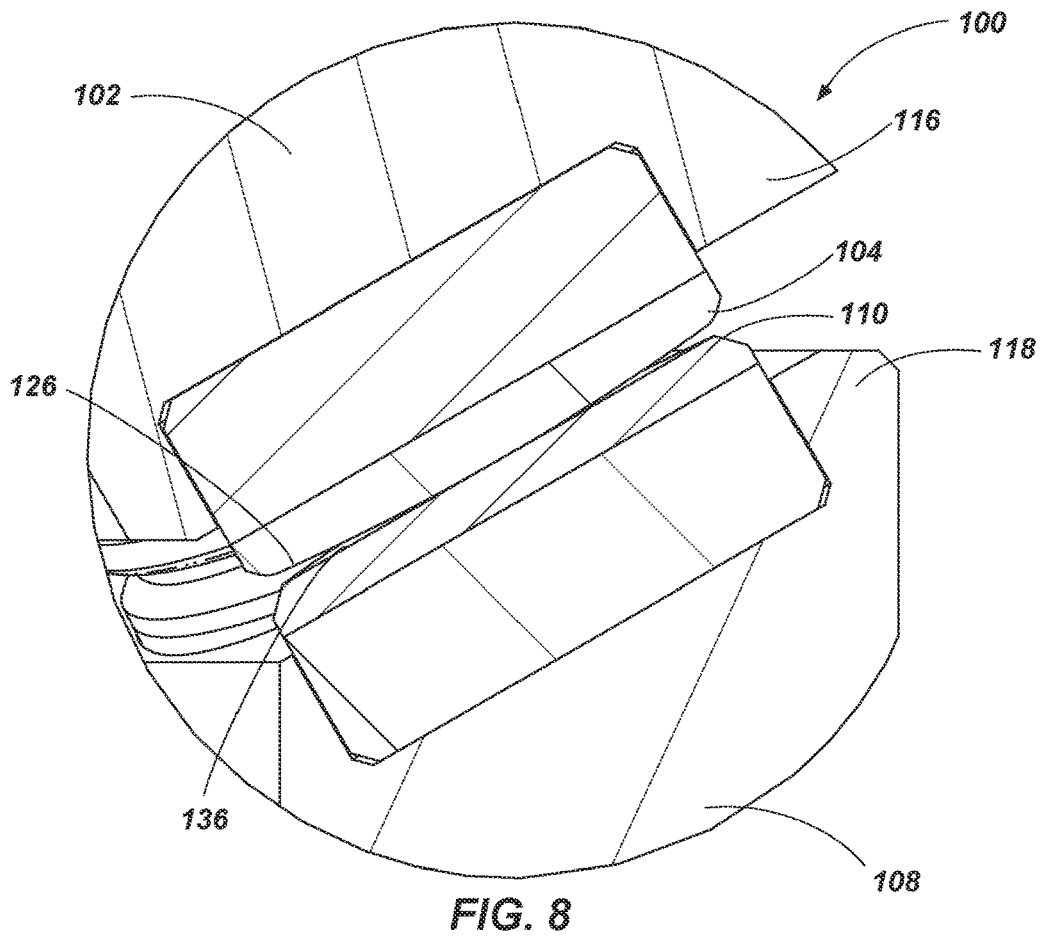
FIG. 8 is a cross-sectional view of a portion of a bearing apparatus according to an embodiment of the disclosure.

FIG. 8 is a cross-sectional view of a portion of a bearing apparatus (e.g., bearing apparatus 100 arranged in a primarily thrust bearing configuration). As shown in FIG. 8, the bearing element 104 of the first bearing assembly 102 includes bearing surfaces 126 that at least portions of which oppose and bear against at least portions of respective bearing surfaces 136 of the bearing elements 110 of a second bearing assembly 108 during use. As shown in FIG. 8, bearing surfaces 126 of the bearing elements 104 may comprise a convex (e.g., partial-ellipsoidal, partial-spherical or partial-cylindrical) surface that opposes and at least partially bears against the bearing surfaces 136 of bearing elements 110 having the partial concave conical bearing surface 136. For example, the bearing surfaces 136 of the bearing elements 110 may exhibit a concave conical shape with a curvature conforming to the ellipsoidal surface shape of the bearing surface 126 on the first bearing assembly 102. Collectively, the bearing surfaces 136 of the bearing elements 110 may define a partially conical shape (e.g., frustoconical) conforming to at least a portion of the collective ellipsoidal surface shape of the bearing surfaces 126 on the first bearing assembly 102.

As discussed above, the bearing surface 136 comprising the concave conical shape may only exhibit a major curvature in one only direction. For example, the curvature of the bearing surface 136 may extend along only a path of rotation between the first bearing assembly 102 and the second bearing assembly 108 (e.g., in a tangential direction to a circular shape of either the first bearing assembly 102 or the second bearing assembly 108). The bearing surface 136 may exhibit minimal to no curvature along a selected reference direction (e.g., a direction normal to the path of rotation). The curvature of the bearing surface 136 may be variable. In one embodiment, the curvature of the bearing surface 136 may decrease and increase, respectively, with respect to a reference axis of the bearing surfaces 136 or with respect to another geometrical feature, without limitation.

Such a configuration may provide an elliptical (e.g., circular) path on which the spherical bearing surfaces 126 of the first bearing assembly 102 may travel in a direction of rotation and also allow for inner bearing axis 107 to be misaligned with outer bearing axis 113 (e.g., form an angle and/or offset between bearing axis 107 and bearing axis 113), while maintaining sufficient contact between bearing surfaces 126 and bearing surfaces 136. In one embodiment, first bearing assembly 102 may be tilted (relative to second bearing assembly 108) (or vice versa) in a direction transverse (e.g., perpendicular) to the direction of rotation. In some embodiments, the shape of the bearing surfaces 136 may enable at least some axial movement of the bearing elements 104 to compensate for one or more of axial misalignment, tilt, and/or axial deflection (e.g., shaft deflection). For example, the bearing surfaces 136 may allow for some axial translation and/or lateral movement resulting from rotation of the shaft to which the bearing apparatus 100 is coupled.

The elliptical path defined by the bearing surfaces 136 of the second bearing assembly 108 may substantially conform to a central portion (e.g., along the direction of rotation) of the spherical bearing surfaces 126 of the first bearing assembly 102 such that a majority of the central portion of the spherical bearing surfaces 126 is in contact with the bearing surfaces 136 of the second bearing assembly 108. However, upper and lower portions relative on either side of the central portion of the spherical bearing surfaces 126 may curve away, and be spaced from, the conical concave bearing surfaces 136 of the second bearing assembly 108.

Figure 9:
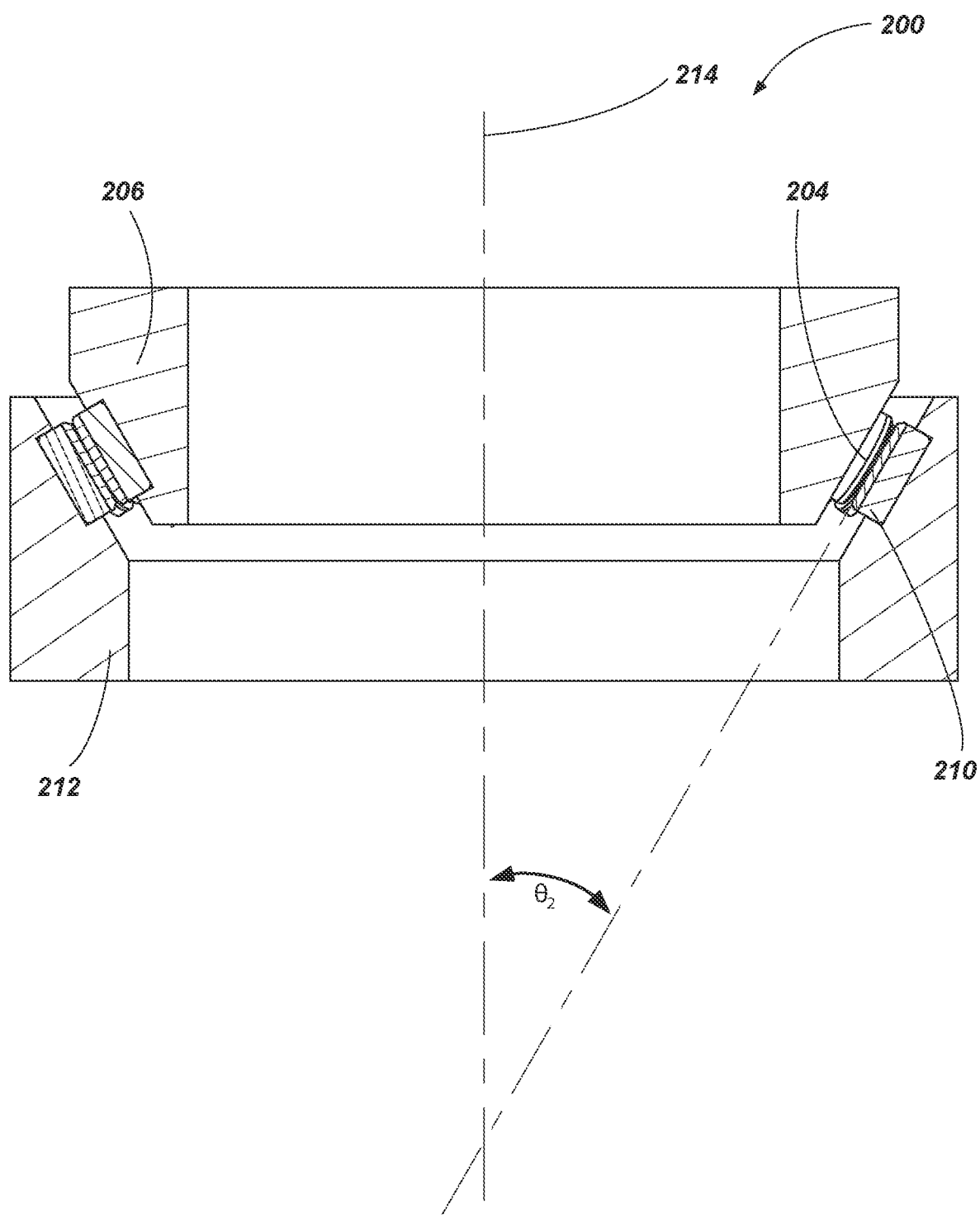
FIG. 9 is a cross-sectional view of a portion of a bearing apparatus according to an embodiment of the disclosure.

FIG. 9 is a cross-sectional view of a portion of a bearing apparatus (e.g., bearing apparatus 200 arranged in a primarily radial bearing configuration). Bearing apparatus 200 may include one or more feature which is similar or identical to the bearing apparatus 100 discussed above and may include one or more similar or identical component of the bearing apparatus 100 discussed above. As shown in FIG. 9, an interface between the bearing elements 204 and bearing elements 210, as positioned by first support structure 206 and second support structure 212, may define a relatively shallower angle θ2 with respect to a longitudinal axis or centerline 214 of the bearing apparatus 200. For example, operating primarily as a radial bearing, the angle θ2 of the interface between the bearing elements 204, 210 may be 45 degrees or less (e.g., 0 to 45 degrees, 30 degrees, 10 to 50 degrees, etc.) relative to the longitudinal axis 214.

Figure 10:
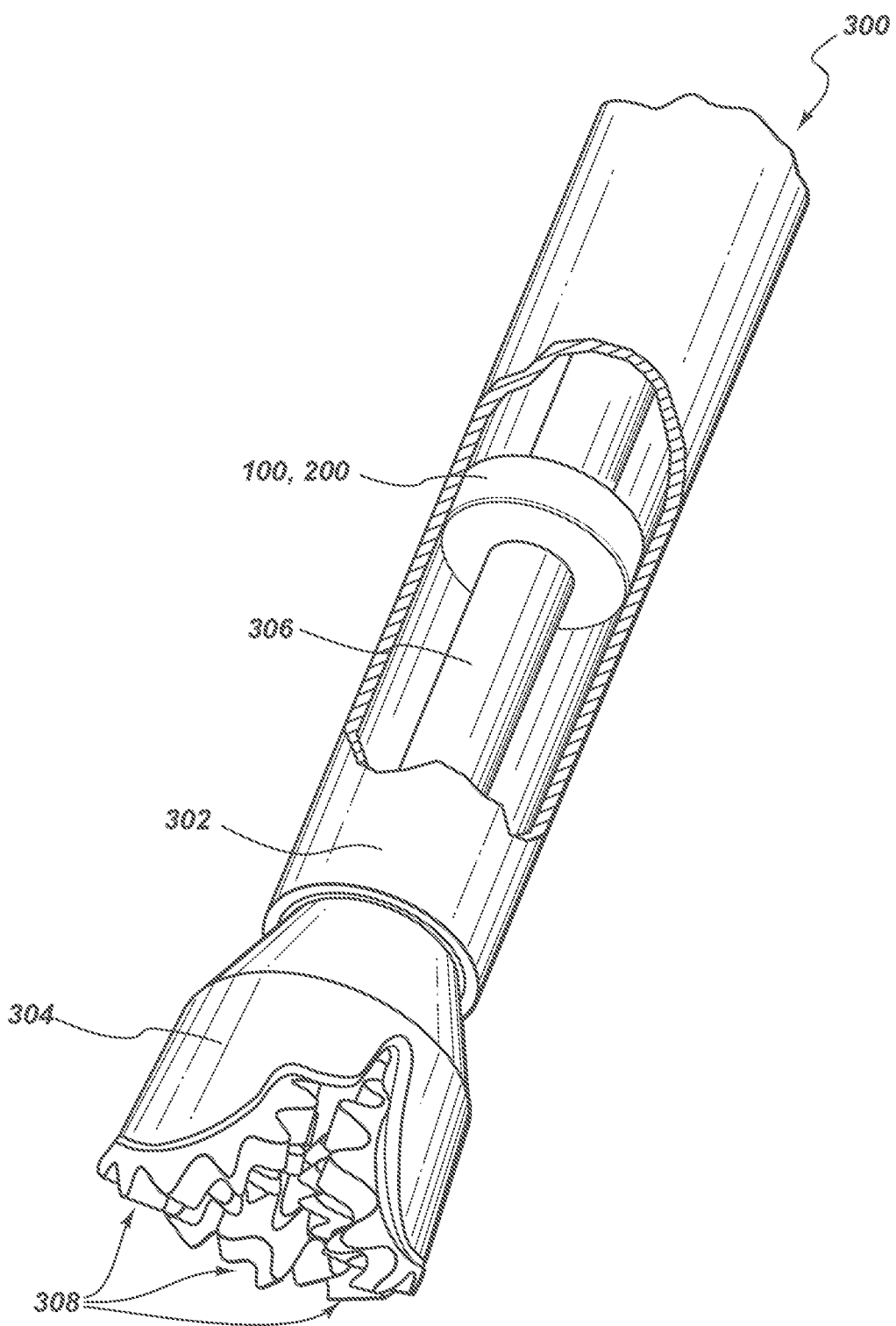
FIG. 10 is a partial cut-away perspective view of a subterranean drilling system including one or more bearing apparatus according to an embodiment of the disclosure.

FIG. 10 is a partial cross-sectional perspective view of an exemplary subterranean system 300 that includes a bearing apparatus (e.g., bearing apparatus 100, bearing apparatus 200). As shown in FIG. 10, subterranean system 300 may include a housing 302 enclosing a downhole drilling motor (e.g., a motor, turbine, or any other suitable device capable of rotating an output shaft, without limitation) that is operably connected to an output shaft 306.

Bearing apparatus 100, 200 may be operably coupled to downhole output shaft 306 such that the rotor or assembly of the bearing apparatus 100, 200 rotates in conjunction with output shaft 306, while the stator or another assembly of the bearing apparatus 100, 200 remains stationary with respect to output shaft 306. A downhole tool (e.g., a rotary drill bit 304) configured to engage a subterranean formation may be connected to output shaft 306. As illustrated in FIG. 10, rotary drill bit 304 may be a roller cone bit comprising a plurality of roller cones 308. According to additional embodiments, rotary drill bit 304 may comprise any suitable type of rotary drill bit, such as, for example, a so-called fixed-cutter drill bit. As a borehole is drilled using rotary drill bit 304, pipe sections may be connected to subterranean drilling system 300 to form a drill string capable of progressively drilling the borehole to a greater depth within a subterranean formation. Any of the bearing assemblies disclosed herein may be used in subterranean drilling system 300, without limitation.

According to various embodiments, drilling fluid may be circulated through the downhole drilling motor to generate torque and effect rotation of output shaft 306 and rotary drill bit 304 attached thereto so that a borehole may be drilled. A portion of the drilling fluid may also be used to lubricate opposing bearing surfaces of superabrasive elements on individual bearing assemblies of the bearing apparatus 100.

Embodiments of the present disclosure may provide bearing assemblies that enable at least some axial movement to compensate for one or more of axial misalignment, tilt, and/or axial deflection (e.g., shaft deflection) while still conforming to an elliptical rotational path of travel between the bearing assemblies of the bearing apparatus. For example, bearing surfaces (e.g., tapered, cylindrical concave bearing surfaces) of one of the bearing assemblies may define a substantially conical overall shape enabling the other bearing assembly to freely rotate at least partially within the conical shape even with some shaft displacement. Further, the tapered bearing surfaces of at least one of the bearing assemblies may exhibit a topology that is relatively less difficult the produce) as compared to a spherical bearing surface.

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, et cetera.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof.

Further, the words "including," "having," and variants thereof (e.g., "includes" and "has") as used herein, including the claims, shall be open ended and have the same meaning as the word "comprising" and variants thereof (e.g., "comprise" and "comprises"). In addition, features from one embodiment may be combined with features of another embodiment while still being encompassed within the scope of the disclosure as contemplated by the inventors.

What is claimed is:

1. A bearing assembly, comprising:
a first bearing assembly comprising:
a first support ring positioned around a first bearing axis; and
one or more first bearing elements coupled to the first support ring, the one or more first bearing elements each having an outward-facing bearing surface; and
a second bearing assembly comprising:
a second support ring positioned around a second bearing axis; and
second bearing elements coupled to the second support ring, the second bearing elements collectively defining an inward-facing, at least partially conical bearing surface being substantially centered about the second bearing axis and being open in a direction along the second bearing axis, the inward-facing, at least partially conical bearing surface of the second bearing elements configured to engage with the outward-facing bearing surface of each of the one or more first bearing elements.

2. The bearing assembly of claim 1, wherein each of the outward-facing bearing surface of the one or more first bearing elements exhibits a partially spherical convex shape.

3. The bearing assembly of claim 1, wherein at least a portion of the first bearing assembly is received within the second bearing assembly to define an open revolute joint and/or an open spheroid joint.

4. The bearing assembly of claim 1, wherein a bearing surface of each of the second bearing elements exhibits a partially conical concave shape with spacing between the bearing surface of each of the second bearing elements defining gaps in the inward-facing, at least partially conical bearing surface.

5. The bearing assembly of claim 1, wherein a majority of a bearing surface of each of the second bearing elements defines and lies along the inward-facing, at least partially conical bearing surface.

6. The bearing assembly of claim 1, wherein the bearing assembly comprises a thrust bearing with the one or more first bearing elements and the second bearing elements being positioned at an oblique angle relative to at least one of the first bearing axis or the second bearing axis.

7. The bearing assembly of claim 6, wherein each of the one or more first bearing elements and the second bearing elements are positioned at a substantially similar or the same oblique angle relative to the at least one of the first bearing axis or the second bearing axis.

8. The bearing assembly of claim 1, wherein each of the second bearing elements comprises a partially conical concave shape having two discrete ramp portions positioned on either lateral side of a curved base portion to collectively define the inward-facing, at least partially conical bearing surface.

9. The bearing assembly of claim 8, wherein the two ramp portions of each of the second bearing elements are positioned adjacent to one of the two ramp portions of an adjacent second bearing element of the second bearing elements.

10. The bearing assembly of claim 8, wherein the curved base portion extends along a substantial entirety of a diameter of the respective second bearing element.

11. The bearing assembly of claim 1, wherein the first bearing assembly exhibits a partially spherical shape that is at least partially received in a complementary open frusto-conical shape of the second bearing assembly.

12. A subterranean tool system, comprising an output shaft operable to apply torque to a downhole tool, the output shaft operably coupled to a bearing assembly comprising the bearing assembly of claim 1.

13. A bearing assembly, comprising:
a first bearing assembly comprising one or more first bearing elements coupled to a first support structure about an intended axis of rotation of the bearing assembly; and
a second bearing assembly comprising second bearing elements coupled to a second support structure about the intended axis of rotation of the bearing assembly, bearing surfaces of the second bearing elements having a majority of each respective bearing surface oriented at an oblique angle relative to the intended axis of rotation, the second bearing elements collectively defining a generally conical bearing surface, the bearing surfaces of the second bearing elements configured to engage with the one or more first bearing elements.

14. The bearing assembly of claim 13, wherein the second bearing assembly defines an open partially spherical joint in which the first bearing assembly is at least partially received.

15. The bearing assembly of claim 13, wherein the bearing surfaces of each of the second bearing elements comprises two discrete ramp portions positioned on either side of a curved base portion.

16. A subterranean tool system, comprising an output shaft operable to apply torque to a downhole tool, the output shaft operably coupled to a bearing assembly comprising the bearing assembly of claim 13.

17. A method of supporting an axial load with a thrust bearing assembly, the method comprising:
positioning a first bearing assembly comprising one or more first bearing elements coupled to a first support structure at least partially within a second bearing assembly comprising second bearing elements coupled to a second support structure, bearing surfaces of the second bearing elements having a majority of each respective bearing surface oriented at an oblique angle relative to an intended axis of rotation;
moving the one or more first bearing elements relative to the second bearing elements; and
sliding the one or more first bearing elements along a generally conical bearing surface collectively defined by the second bearing elements.

18. The method of claim 17, further comprising transferring the axial load from the one or more first bearing elements to the second bearing elements in a direction at least partially along the intended axis of rotation.

19. The method of claim 17, further comprising engaging a partially spherical convex shape of with the one or more first bearing elements with the generally conical bearing surface collectively defined by the second bearing elements.

20. The method of claim 17, further comprising positioning a majority of the one or more first bearing elements within the generally conical bearing surface collectively defined by the second bearing elements.

\* \* \* \* \*